US012802986B2

(12) United States Patent
Kim et al.

(10) Patent No.: US 12,802,986 B2
(45) Date of Patent: Nov. 17, 2026

(54) ALL-SOLID LITHIUM SECONDARY BATTERY AND PREPARATION METHOD THEREOF

(71) Applicant: LG Energy Solution, Ltd., Seoul (KR)

(72) Inventors: Tae Gon Kim, Daejeon (KR); Dong Chan Lee, Daejeon (KR); Jeong Beom Lee, Daejeon (KR); Sul Cham Kim, Daejeon (KR); Hye Jin Kwon, Daejeon (KR); Hoe Jin Hah, Daejeon (KR); Ki Tae Kim, Daejeon (KR); So Hee Kim, Daejeon (KR); Jeong Gil Kim, Daejeon (KR); Myeong Soo Kim, Daejeon (KR)

(73) Assignee: LG Energy Solution, LTD., Seoul (KR)

( * ) Notice: Subject to any disclaimer, the term of this patent is extended or adjusted under 35 U.S.C. 154(b) by 756 days.

(21) Appl. No.: 18/034,650

(22) PCT Filed: May 27, 2022

(86) PCT No.: PCT/KR2022/007604
§ 371 (c)(1),
(2) Date: Apr. 28, 2023

(87) PCT Pub. No.: WO2022/250504
PCT Pub. Date: Dec. 1, 2022

(65) Prior Publication Data
US 2023/0395801 A1 Dec. 7, 2023

(30) Foreign Application Priority Data
May 28, 2021 (KR) ........................ 10-2021-0069413

(51) Int. Cl.
*H01M 4/587* (2010.01)
*H01M 4/02* (2006.01)
(Continued)

(52) U.S. Cl.
CPC ......... *H01M 4/587* (2013.01); *H01M 4/0404* (2013.01); *H01M 4/133* (2013.01);
(Continued)

(58) Field of Classification Search
CPC ........ H01M 4/133; H01M 4/38; H01M 4/587; H01M 4/661; H01M 4/667; H01M 10/0562; H01M 2004/027; H01M 2300/0065
See application file for complete search history.

(56) References Cited

U.S. PATENT DOCUMENTS

2008/0220329 A1 9/2008 Kojima et al.
2014/0272596 A1 9/2014 Yamamoto et al.
(Continued)

FOREIGN PATENT DOCUMENTS

CN 101140986 A 3/2008
CN 111656573 A 9/2020
(Continued)

OTHER PUBLICATIONS

Ultrafine Silver Nanoparticles for Seeded Lithium Deposition toward Stable Lithium Metal Anode, Yang et al., Adv. Mater. 2017, 29, 1702714 (Year: 2017).*
(Continued)

*Primary Examiner* — Scott J. Chmielecki
(74) *Attorney, Agent, or Firm* — Bryan Cave Leighton Paisner LLP

(57) ABSTRACT

An all-solid lithium secondary battery and a preparation method thereof are proved. The all-solid lithium secondary battery comprises a positive electrode active material layer, a negative electrode active material layer including graphitized platelet carbon nanofibers and silver nanoparticles, and
(Continued)

a solid electrolyte layer between the positive electrode active material layer and the negative electrode active material layer.

17 Claims, 9 Drawing Sheets

(51) Int. Cl.

| | |
|---|---|
| ***H01M 4/04*** | (2006.01) |
| ***H01M 4/133*** | (2010.01) |
| ***H01M 4/134*** | (2010.01) |
| ***H01M 4/1393*** | (2010.01) |
| ***H01M 4/1395*** | (2010.01) |
| ***H01M 4/36*** | (2006.01) |
| ***H01M 4/38*** | (2006.01) |
| ***H01M 4/66*** | (2006.01) |
| ***H01M 10/0525*** | (2010.01) |
| ***H01M 10/0562*** | (2010.01) |
| ***H01M 10/0585*** | (2010.01) |

(52) U.S. Cl.

CPC ......... *H01M 4/134* (2013.01); *H01M 4/1393* (2013.01); *H01M 4/1395* (2013.01); *H01M 4/366* (2013.01); *H01M 4/38* (2013.01); *H01M 4/661* (2013.01); *H01M 4/667* (2013.01); *H01M 10/0525* (2013.01); *H01M 10/0562* (2013.01); *H01M 10/0585* (2013.01); *H01M 2004/021* (2013.01); *H01M 2004/027* (2013.01); *H01M 2300/0065* (2013.01)

(56) References Cited

U.S. PATENT DOCUMENTS

| | | | | |
|---|---|---|---|---|
| 2016/0204430 | A1* | 7/2016 | Hiraoka ................ | H01M 4/131<br>429/223 |
| 2017/0194636 | A1* | 7/2017 | Osada .................. | H01M 4/581 |
| 2019/0157723 | A1* | 5/2019 | Suzuki .................. | H01M 4/133 |
| 2019/0198916 | A1 | 6/2019 | Yoon et al. | |
| 2020/0144599 | A1 | 5/2020 | Lee et al. | |
| 2020/0152981 | A1* | 5/2020 | Kim ....................... | C01G 53/50 |
| 2021/0210791 | A1 | 7/2021 | Suzuki et al. | |
| 2022/0359881 | A1 | 11/2022 | Yachi et al. | |

FOREIGN PATENT DOCUMENTS

| | | | | | |
|---|---|---|---|---|---|
| JP | 2004-220910 | A | | 8/2004 | |
| JP | 2006240958 | A | * | 9/2006 | |
| JP | 3958781 | B2 | | 8/2007 | |
| JP | 2009059713 | A | | 3/2009 | |
| JP | 2011181463 | A | | 9/2011 | |
| JP | 2014177722 | A | | 9/2014 | |
| JP | 2019021503 | A | | 2/2019 | |
| JP | 2013-055006 | A | | 3/2021 | |
| JP | 2021048006 | A | | 3/2021 | |
| KR | 10-2008-0022494 | A | | 3/2008 | |
| KR | 10-2008-0111809 | A | | 12/2008 | |
| KR | 10-1594836 | B1 | | 2/2016 | |
| KR | 20170088173 | A | * | 8/2017 | .......... H01M 4/0435 |
| KR | 10-2019-0079132 | A | | 7/2019 | |
| KR | 10-2020-0052707 | A | | 5/2020 | |
| KR | 10-2020-0078479 | A | | 7/2020 | |
| WO | 2020262566 | A1 | | 12/2020 | |

OTHER PUBLICATIONS

Yang et al., Ultrafine Silver Nanoparticles for Seeded Lithium Deposition toward Stable Lithium Metal Anode, L. Hu, Adv. Mater.2017, 29, 1702714 (Year: 2017).*

KR-20170088173-A English machine translation (Year: 2017).*

Seongyop Lim et al: "Surface Modification of Carbon Nanofiber with High Degree of Graphitization ; The Journal of Physical Chemistry B", Journal of Physical Chemistry Part B, vol. 108, No. 5, Feb. 1, 2004, pp. 1533-1536, xp093224709 US ISSN: 1520-6106, DOI:10.1021/jp036819r.

Chunpeng Yang et al: "Ultrafine Silver Nanoparticles for Seeded Lithium Deposition toward Stable Lithium Metal Anode", Advanced Materials, VCH Publishers, DE, vol. 29, No. 38, Aug. 18, 2017, p. n/a, XP071871785, ISSN:0935-9648, DOI: 10.1002/ADMA.201702714.

Yong-Gun Lee et al., "High-energy long-cycling all-solid-state lithium metal batteries enabled by silver-carbon composite anodes", Nature Energy, 5, (2020), pp. 299-308.

Yu-Jin Han et al., "Enhancement of the rate performance of plasma-treated platelet carbon nanofiber anodes in lithium-ion batteries", RSC Advances, vol. 6, (2016), pp. 4810-4817.

Min Liu et al., "Silver Nanoparticle-Doped 3D Porous Carbon Nanofibers as Separator Coating for Stable Lithium Metal Anodes", ACS Applied Materials & Interfaces, vol. 11, (2019), pp. 17843-17852.

H. Habazaki et al., "High Rate Capability of Carbon Nanofilaments with Platelet Structure as Anode Materials for Lithium Ion Batteries", Electrochemistry Communications, vol. 8, No. 8, (2006), pp. 1275-1279.

* cited by examiner

ALL-SOLID LITHIUM SECONDARY BATTERY AND PREPARATION METHOD THEREOF

CROSS REFERENCE WITH RELATED APPLICATION(S)

This application is a National Stage Application of International Application No. PCT/KR2022/007604 filed on May 27, 2022, which claims priority to Korean Patent Application No. 10-2021-0069413 filed on May 28, 2021, the disclosures of which are incorporated herein by reference in their entirety.

FIELD

The present disclosure relates to an all-solid lithium secondary battery and a preparation method thereof.

BACKGROUND

Secondary batteries have been mainly applied to the field of small-sized devices such as mobile device and notebook computer, but their application direction has recently been extended to the field of medium and large-sized devices, for example, the applications requiring high energy and high output such as energy storage system (ESS) and electric vehicle (EV).

Recently, interest in an all-solid lithium secondary battery tends to increase. The all-solid lithium secondary battery is a secondary battery using a non-flammable inorganic solid electrolyte instead of a liquid electrolyte, wherein the all-solid lithium secondary battery is attracting attention in that it has higher thermal stability than a lithium secondary battery using the liquid electrolyte, has a very low risk of explosion due to leakage during overcharge, and is not required to add equipment for preventing the explosion risk.

However, since the all-solid lithium secondary battery uses a rather bulky solid electrolyte, there are many attempts to improve energy density of the battery. For this purpose, a metal layer capable of forming an alloy with lithium, such as lithium metal, is used as a negative electrode active material layer. However, if the metal layer is used, since pores are generated between the solid electrolyte and the metal layer while lithium precipitated on the metal layer is ionized and dissolved, it adversely affects battery operation. Also, since lithium metal is precipitated as dendrites on a surface of the metal layer during discharge of the all-solid lithium secondary battery, lifetime and safety of the all-solid lithium secondary battery are degraded.

In order to solve such a problem, conventionally, a method of applying a high external pressure by disposing an end plate for preventing the generation of the pores on a positive electrode or negative electrode is also used. However, since a volume of the all-solid lithium secondary battery is excessively increased when the end plate applying the external pressure is used, there is a problem in that the energy density of the all-solid lithium secondary battery is reduced.

Thus, there is a need for a new method capable of improving the lifetime and safety of the all-solid lithium secondary battery.

SUMMARY

An aspect of the present disclosure provides an all-solid lithium secondary battery in which lithium metal may be effectively stored by reducing lithium ions during charge, initial charge/discharge efficiency may be improved, and life characteristics may be improved.

Another aspect of the present disclosure provides an all-solid lithium secondary battery having price competitiveness by reducing an amount of silver nanoparticles used.

Another aspect of the present disclosure provides a method of preparing the above-described all-solid lithium secondary battery.

According to an aspect of the present disclosure, there is provided an all-solid lithium secondary battery including a positive electrode active material layer, a negative electrode active material layer, and a solid electrolyte layer disposed between the positive electrode active material layer and the negative electrode active material layer, wherein the negative electrode active material layer includes graphitized platelet carbon nanofibers (GPCNF) and silver nanoparticles.

According to another aspect of the present disclosure, there is provided a method of preparing an all-solid lithium secondary battery which includes: a first step of forming dry mixed powder including graphitized platelet carbon nanofibers and silver nanoparticles disposed on the graphitized platelet carbon nanofibers by reducing silver ions in a mixture of the silver ions and the graphitized platelet carbon nanofibers; and a second step of forming a negative electrode active material layer on a negative electrode collector through a negative electrode mixture including the dry mixed powder.

With respect to an all-solid lithium secondary battery according to the present disclosure, since a negative electrode active material layer includes graphitized platelet carbon nanofibers and silver nanoparticles, lithium ions are reduced and precipitated by the negative electrode active material layer during charge, and thus, the lithium ions may be effectively stored in a negative electrode. Also, since the stored lithium may be dissolved in the form of lithium ions during discharge, the lithium ions may move to a positive electrode. The graphitized platelet carbon nanofibers may improve initial charge/discharge efficiency and life characteristics of the battery by increasing mobility of the lithium ions. Furthermore, as the graphitized platelet carbon nanofibers are used, since the above-described lithium ions may effectively move even with the use of a low amount of the silver nanoparticles, price competitiveness of the all-solid lithium secondary battery prepared may be increased.

DETAILED DESCRIPTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present disclosure. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, the expression "specific surface area" is measured by a Brunauer-Emmett-Teller (BET) method, wherein, specifically, the specific surface area may be calculated from a nitrogen gas adsorption amount at a liquid nitrogen temperature (77K) using BELSORP-mini II by Bell Japan Inc.

Figure 1:
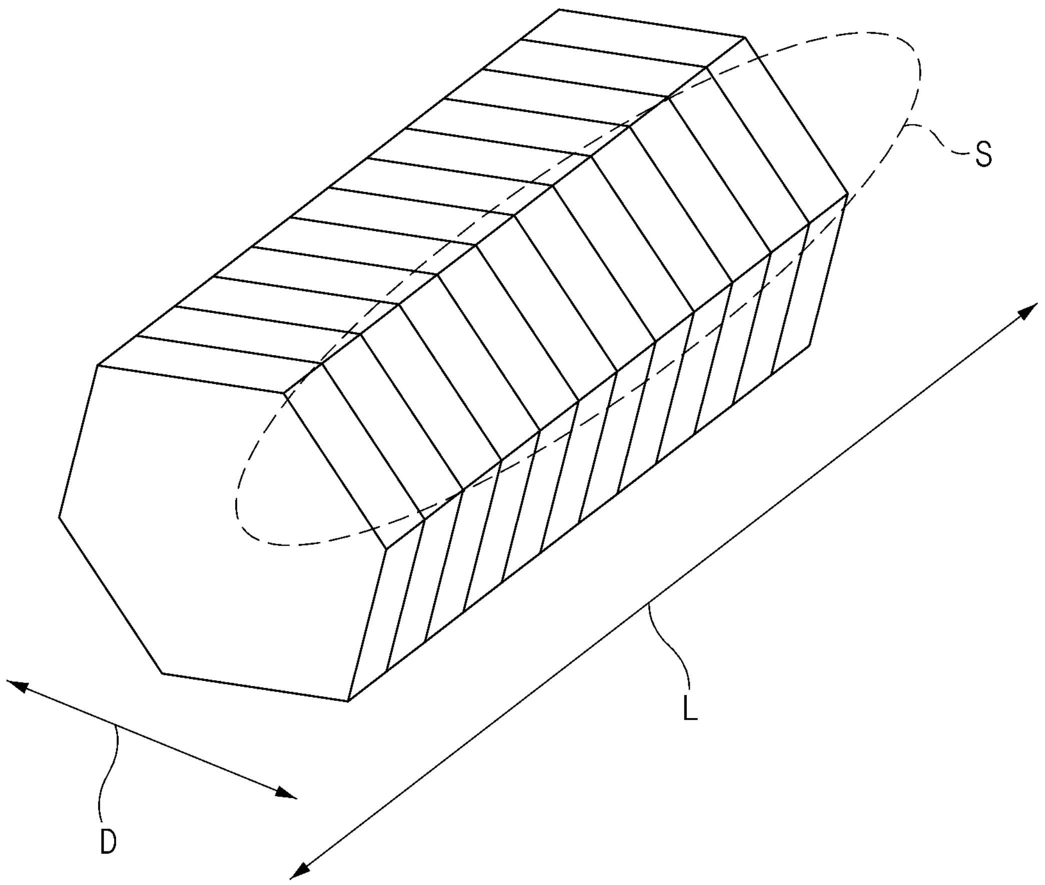
FIG. 1 is a perspective diagram of a graphitized platelet carbon nanofiber described in the present disclosure.

The expression graphitized platelet carbon nanofiber in the present specification may mean a carbon structure in which graphene sheets are stacked to have a fiber shape. Referring to FIG. 1, the graphitized platelet carbon nanofiber may mean a carbon nanofiber having a structure in which hexagonal mesh planes of carbon are arranged at right angles to a fiber axis (L). A length of the graphitized platelet carbon nanofiber means a length of a line segment or curve which appears when one end and the other end of the graphitized platelet carbon nanofiber are connected along the graphitized platelet carbon nanofiber, and, for example, may mean a distance between the one end and the other end along the fiber axis of the graphitized platelet carbon nanofiber when the graphitized platelet carbon nanofiber is stretched in a straight line. Also, a diameter of the graphitized platelet carbon nanofiber means a width of the graphitized platelet carbon nanofiber in a short axis (D) direction which is perpendicular to the fiber axis (L) of the graphitized platelet carbon nanofiber and is parallel to a plane of the graphene sheet or the hexagonal mesh plane of carbon.

Figure 2:
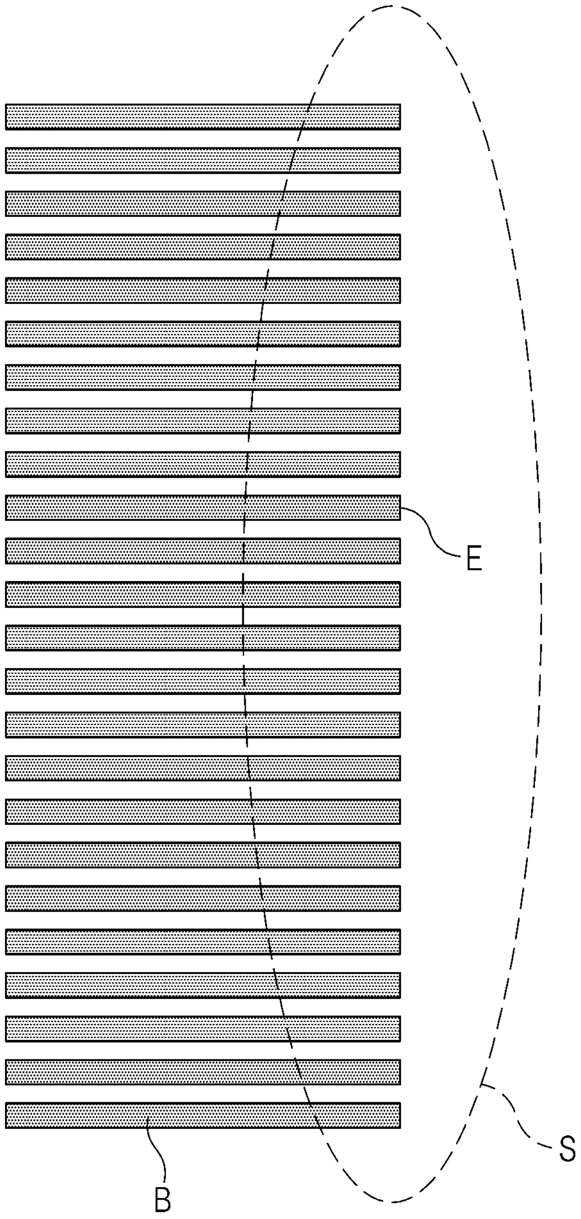
FIG. 2 is a schematic diagram of a platelet carbon nanofiber described in the present disclosure.
Figure 3:
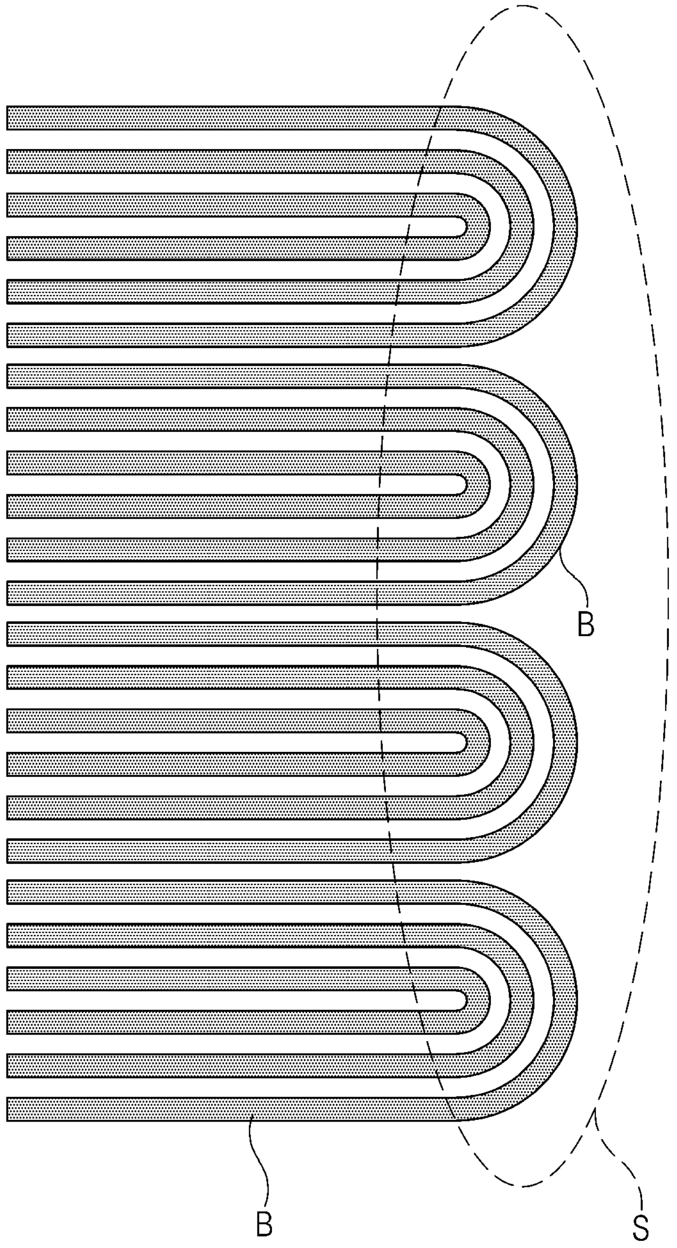
FIG. 3 is a schematic diagram of the graphitized platelet carbon nanofiber described in the present disclosure.
Figure 6:
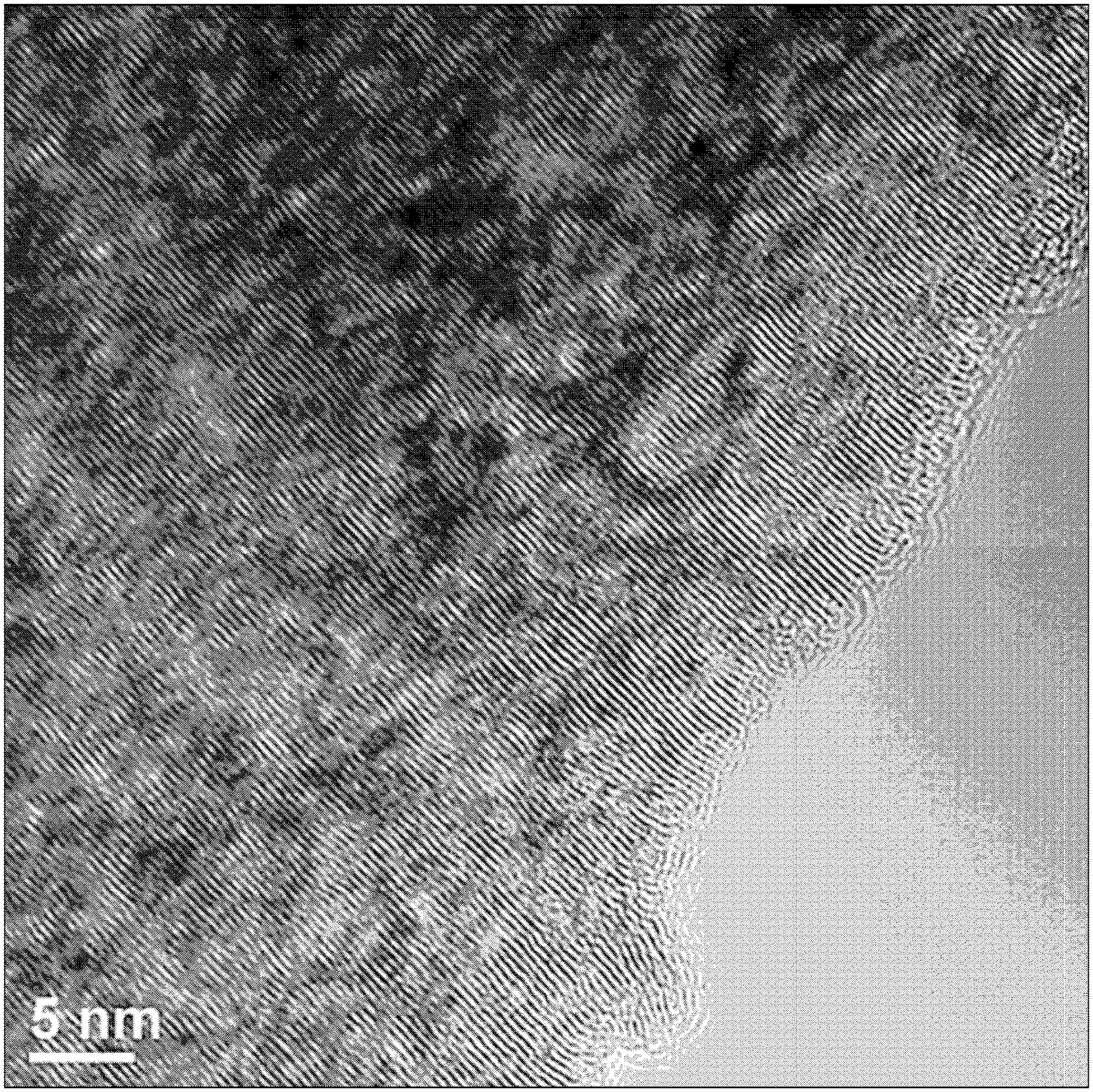
FIG. 6 is a transmission electron microscope (TEM) image of the platelet carbon nanofiber described in the present disclosure.

FIG. 2 and FIG. 3 are schematic views for explaining a side (S) of the carbon nanofiber of FIG. 1. Referring to FIGS. 2 and 3, a difference between platelet carbon nanofiber and graphitized platelet carbon nanofiber may be seen. The platelet carbon nanofiber has the same shape as described in the above paragraph. However, the side of the platelet carbon nanofiber is in a form in which edge planes (E of FIG. 2) of the graphene sheets (black line segments in FIGS. 2 and 3) are exposed, but the side of the graphitized platelet carbon nanofiber is in a form in which basal planes (B of FIG. 3) are exposed. This difference is also clearly seen through TEM images of the platelet carbon nanofiber of FIG. 6 and the graphitized platelet carbon nanofiber of FIG. 7.

Figure 7:
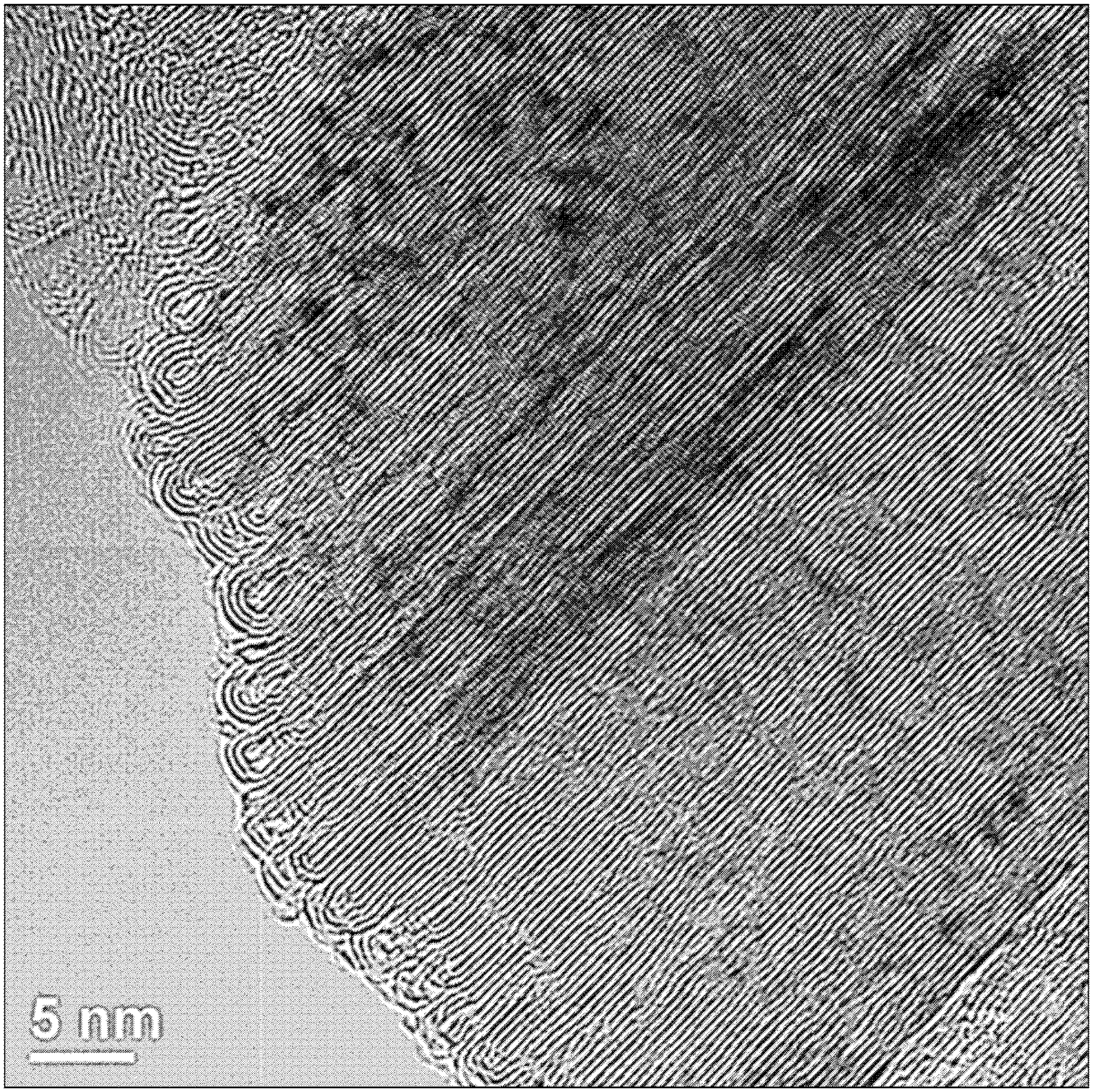
FIG. 7 is a TEM image of the graphitized platelet carbon nanofiber described in the present disclosure.

Specifically, the graphitized platelet carbon nanofiber has a form in which a plurality of graphene sheets are stacked in a growth direction of the graphitized platelet carbon nanofiber, and the graphitized platelet carbon nanofiber includes a curved portion protruding toward the side of the graphitized platelet carbon nanofiber, wherein the curved portion corresponds to the basal plane of the graphene sheet. The curved portion is formed by extending one graphene sheet to be connected to another graphene sheet, and the basal planes are exposed from the side of the graphitized platelet carbon nanofiber toward the outside as illustrated in FIGS. 3 and 7. More specifically, the basal plane has a closed loop shape, and may exist in a curved state at the side of the graphitized platelet carbon nanofiber. The loop shape may appear periodically along the growth direction of the graphitized platelet carbon nanofiber.

The graphitized platelet carbon nanofiber may be formed by graphitizing the platelet carbon nanofiber through a heat treatment at a high temperature. Specifically, the graphitized platelet carbon nanofiber may be formed by heat-treating the platelet carbon nanofiber at a temperature of 2,000° C. or higher, for example, 2,000° C. to 3,500° C. The heat treatment time may be in a range of 10 minutes to 24 hours.

In the present specification, a XRD (X-ray diffraction) measurement method of the graphitized platelet carbon nanofiber and the platelet carbon nanofiber may be as follows. A Bruker AXS D4 Endeavor XRD (voltage: 40 kV, current: 40 mA) may be used, and XRD analysis may be performed by measuring at a scanning rate of 87.5 seconds for every 0.02° from a 2-Theta of 10° to 90° under Cu Kα radiation (wavelength: 1.54 Å). Among the measurement results, a Full Width at Half-Maximum (FWHM) of a (002) crystal peak, which appears at a 2θ of about 20° to 30°, may be measured, and may be calculated through the Scherrer equation to obtain a d(002) value and a Lc(002) value.

$I_D/I_G$ (ratio) of the present specification may be measured from a wavelength-peak graph during Raman spectrum measurement. Specifically, after fitting the graph by setting a base line so that a D peak and a G peak may be distinguished, the $I_D/I_G$ may be identified by dividing D peak intensity by G peak intensity (using built-in software, NRS-2000B, Jasco). In the Raman spectrum, a G peak near 1590 $cm^{-1}$ is due to $E_{2g}$ vibration mode of $sp^2$ bonds of carbon, and a D peak near 1350 $cm^{-1}$ appears when there is a defect in the $sp^2$ bonds of carbon.

An average diameter of the graphitized platelet carbon nanofibers (or the platelet carbon nanofibers) in the present specification corresponds to an average value of diameters of top 50 graphitized platelet carbon nanofibers (or platelet carbon nanofibers) and diameters of bottom 50 graphitized platelet carbon nanofibers (or platelet carbon nanofibers) in order of largest diameter when a negative electrode active material layer is observed at ×20,000 magnification with a scanning electron microscope (SEM).

An average length of the graphitized platelet carbon nanofibers (or the platelet carbon nanofibers) in the present specification corresponds to an average value of lengths of top 50 graphitized platelet carbon nanofibers (or platelet carbon nanofibers) and lengths of bottom 50 graphitized platelet carbon nanofibers (or platelet carbon nanofibers) in order of greatest length when the negative electrode active material layer is observed at ×20,000 magnification with an SEM.

An average particle diameter of silver nanoparticles in the present specification corresponds to an average value of particle diameters of top 50 silver nanoparticles having a large particle diameter and particle diameters of bottom 50 silver nanoparticles when the platelet carbon nanofiber including the prepared silver nanoparticles or the platelet carbon nanofiber including the silver nanoparticles of the negative electrode active material layer is observed at ×1,000,000 magnification with a transmission electron microscope (TEM).

Hereinafter, the present disclosure will be described in detail.

All-Solid Lithium Secondary Battery

An all-solid lithium secondary battery according to an embodiment of the present disclosure includes a positive electrode active material layer, a negative electrode active material layer, and a solid electrolyte layer disposed between the positive electrode active material layer and the negative electrode active material layer, wherein the negative electrode active material layer may include graphitized platelet carbon nanofibers (GPCNF) and silver nanoparticles.

(1) Negative Electrode Active Material Layer

The all-solid lithium secondary battery may include a negative electrode active material layer. Specifically, the all-solid lithium secondary battery may include a negative electrode, and the negative electrode may include a negative electrode collector and a negative electrode active material layer.

The negative electrode collector is not particularly limited so long as it has conductivity without causing adverse chemical changes in the battery. For example, copper, stainless steel, aluminum, nickel, titanium, fired carbon, or aluminum or stainless steel that is surface-treated with one of carbon, nickel, titanium, silver, or the like may be used as the negative electrode collector. Specifically, a transition metal that absorbs carbon well, such as nickel or stainless steel metal, may be used as the negative electrode collector.

Figure 4:
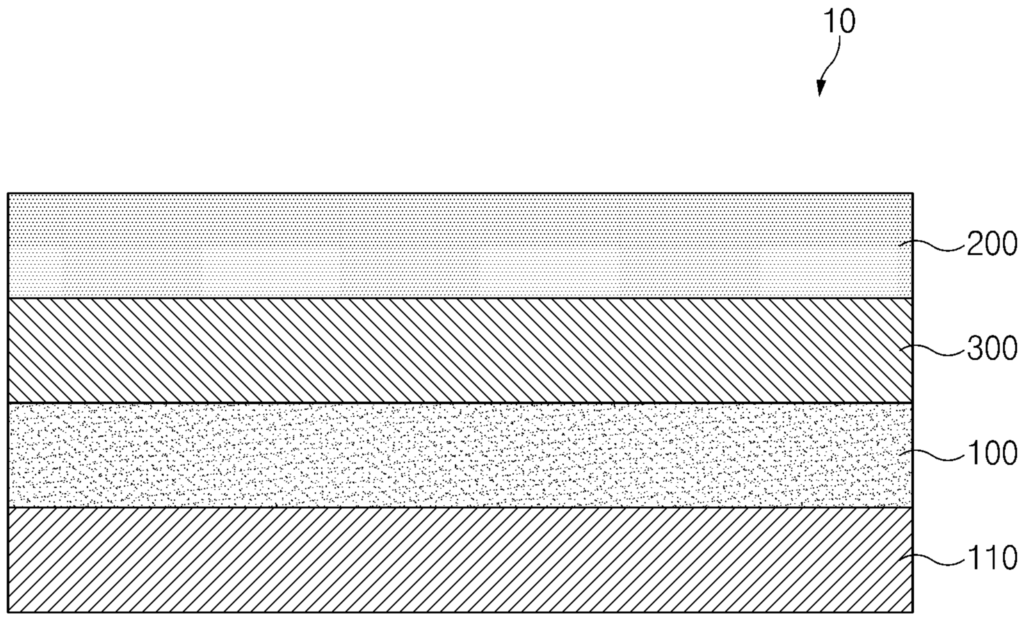
FIG. 4 is a schematic diagram of an all-solid lithium secondary battery according to an embodiment of the present disclosure.

Referring to FIG. 4, the negative electrode active material layer 100 may be disposed on at least one surface of the negative electrode collector 110. Specifically, the negative electrode active material layer 100 may be disposed on one surface of the negative electrode collector 110, or alternatively, may be disposed on both surfaces of the negative electrode collector (not shown).

The negative electrode active material layer may include graphitized platelet carbon nanofibers and silver nanoparticles. Specifically, the negative electrode active material layer may be composed of graphitized platelet carbon nanofibers and silver nanoparticles.

1) Graphitized Platelet Carbon Nanofiber

The graphitized platelet carbon nanofiber may act as a movement path for lithium ions transferred from the positive electrode active material layer to be easily precipitated and stored on the negative electrode collector.

The graphitized platelet carbon nanofiber includes a curved portion protruding toward a side of the graphitized platelet carbon nanofiber, wherein the curved portion corresponds to a basal plane of the graphene sheet. That is, the basal planes are exposed from the side of the graphitized platelet carbon nanofiber toward the outside. More specifically, the basal plane has a closed loop shape, and may exist in a curved state at the side of the graphitized platelet carbon nanofiber. The loop shape may appear periodically along a growth direction of the graphitized platelet carbon nanofiber. Since movement of lithium ions on the basal plane may occur rapidly, the graphitized platelet carbon nanofiber may play a role in inducing rapid movement of the lithium ions. Accordingly, irreversible capacity for initial storage of the lithium ions may be reduced.

In X-ray diffraction (XRD) measurement of the graphitized platelet carbon nanofiber, d(002) of the graphitized platelet carbon nanofiber may be in a range of 0.330 nm to 0.350 nm, particularly 0.330 nm to 0.345 nm, and more particularly 0.330 nm to 0.340 nm. In a case in which the above range is satisfied, since crystallinity of the graphitized platelet carbon nanofiber is high, electrical conductivity is significantly improved and it is advantageous for storage and movement of the lithium ions.

In the XRD measurement of the platelet carbon nanofiber, Lc(002) of the platelet carbon nanofiber may be in a range of 20 nm to 200 nm, particularly 20 nm to 150 nm, and more particularly 20 nm to 100 nm, for example, 35 nm to 100 nm. In a case in which the above range is satisfied, since the graphitized platelet carbon nanofiber has an excellent degree of graphitization, the electrical conductivity is improved, and, since defects of crystallinity in a longitudinal direction of the graphitized platelet carbon nanofiber are small, mechanical strength of the material itself may be excellent. Thus, in a process of dispersing and using the graphitized platelet carbon nanofibers, a phenomenon, in which the graphitized platelet carbon nanofiber is cut, may be reduced, and a battery degradation phenomenon due to defects of the graphitized platelet carbon nanofibers during charge and discharge of the battery may be minimized.

The graphitized platelet carbon nanofiber may have an $I_D/I_G$ of 0.1 to 1.0, particularly 0.1 to 0.5, and more particularly 0.1 to 0.3 during Raman spectrum measurement. When the above range is satisfied, since the crystallinity of the graphitized platelet carbon nanofiber is high, the electrical conductivity is significantly improved and it is advantageous for the storage and movement of the lithium ions.

An average length of the graphitized platelet carbon nanofibers may be in a range of 0.1 μm to 5 μm, particularly 0.1 μm to 2.5 μm, and more particularly 0.1 μm to 1 μm. When the above range is satisfied, since a conductive path may be effectively formed in the negative electrode active material layer, efficiency of the all-solid lithium secondary battery may be improved. Also, structural collapse of the negative electrode active material layer may be effectively suppressed even when an alloying reaction of the silver nanoparticles with the lithium ions occurs to change their volume.

An average diameter of the graphitized platelet carbon nanofibers may be in a range of 10 nm to 500 nm, particularly nm to 400 nm, and more particularly 10 nm to 300 nm. When the above range is satisfied, a mechanical structure of the graphitized platelet carbon nanofiber may be effectively maintained even if the storage and movement of the lithium ions occur through the graphitized platelet carbon nanofiber.

A specific surface area of the graphitized platelet carbon nanofiber may be in a range of 5 $m^2/g$ to 10 $m^2/g$, particularly 5 $m^2/g$ to 80 $m^2/g$, and more particularly 5 $m^2/g$ to 60 $m^2/g$. In a case in which the above range is satisfied, since the silver nanoparticles may be stably disposed on a surface of the graphitized platelet carbon nanofiber, the storage and movement of the lithium ions may be effectively performed.

The graphitized platelet carbon nanofibers may be included in an amount of 50 wt % to 98 wt %, particularly 60 wt % to 95 wt %, and more particularly 70 wt % to 90 wt % in the negative electrode active material layer. When the above range is satisfied, since mobility of the lithium ions may be effectively improved while a decrease in energy density of the all-solid lithium secondary battery is minimized, initial charge/discharge efficiency and life characteristics of the all-solid lithium secondary battery may be improved.

2) Silver Nanoparticle

Since the silver nanoparticle has lithiophilic properties, it may be easily alloyed with lithium ions. Accordingly, the silver nanoparticle may form an alloy with the lithium ions transferred from the positive electrode active material layer to promote the storage and diffusion of the lithium ions into the negative electrode active material layer.

The silver nanoparticle may include silver (Ag). Furthermore, the silver nanoparticle may further include at least one selected from the group consisting of gold, platinum, palladium, silicon, aluminum, bismuth, tin, indium, and zinc. Alternatively, the silver nanoparticle may be formed of silver. The silver nanoparticle may be in a solid phase.

The silver nanoparticle may be disposed on the surface of the graphitized platelet carbon nanofiber. Specifically, the silver nanoparticles may be formed by reducing silver ions in a silver ion solution on the surface of the graphitized platelet carbon nanofiber, and, accordingly, the silver nanoparticles may be disposed on the surface of the graphitized platelet carbon nanofiber. Alternatively, the silver nanoparticles may be disposed on the surface of the platelet carbon nanofibers by mixing powder of silver nanoparticles and the platelet carbon nanofibers in a powder state.

An average particle diameter of the silver nanoparticles may be in a range of 1 nm to 100 nm, particularly 1 nm to 50 nm, and more particularly 1 nm to 30 nm, for example, 1 nm to 2 nm. When the above range is satisfied, since the silver nanoparticles may be effectively dispersed in the negative electrode active material layer, the storage and diffusion of the lithium ions may be facilitated even if an amount of the silver nanoparticles is low. In addition, initial efficiency and life characteristics of the battery may be improved.

In the negative electrode active material layer, the silver nanoparticles may be included in an amount of 1 wt % to wt % based on a total weight of the graphitized platelet carbon nanofibers and the silver nanoparticles, and may be specifically included in an amount of 3 wt % to 30 wt %, more specifically, 5 wt % to 20 wt %, for example, 7 wt % to 10 wt %. When the above range is satisfied, since the lithium ions transferred from the positive electrode active material layer may be effectively alloyed with the silver nanoparticles, electrochemical properties of the all-solid lithium secondary battery may be improved. Also, since the silver nanoparticles with a rather low silver content are used, the energy density and price competitiveness of the all-solid lithium secondary battery may be improved.

Particularly, that the silver nanoparticles may be used in an amount of 10 wt % or less, specifically, 7 wt % to 10 wt % is because the negative electrode active material layer includes the graphitized platelet carbon nanofibers. The lithium ions transferred from the positive electrode active material layer are alloyed with the silver nanoparticles having lithiophilic properties to promote the storage and diffusion of the lithium ions into the negative electrode, wherein the storage and diffusion of the lithium ions as described above may be further promoted particularly through a layered structure on the platelet carbon nanofiber described in the present disclosure. Thus, a rate at which lithium metal is precipitated and stored on the negative electrode active material layer and the negative electrode collector may also be improved. Also, since the side of the graphitized platelet carbon nanofiber has a closed loop shape at regular intervals, dispersion and arrangement of the silver nanoparticles along a curved surface may be effectively made and aggregation of the silver nanoparticles may be effectively suppressed even in a process of repeatedly charging and discharging the battery. Accordingly, capacity and initial charge/discharge efficiency of the all-solid lithium secondary battery may be sufficiently improved even with a small amount of the silver nanoparticles.

In the negative electrode active material layer, a weight ratio of the graphitized platelet carbon nanofibers to the silver nanoparticles may be in a range of 99:1 to 60:40, particularly 97:3 to 70:30, and more particularly 95:5 to 80:20, for example, 95:5 to 88:12. When the above range is satisfied, the capacity and initial charge/discharge efficiency of the all-solid lithium secondary battery may be more effectively improved.

A loading amount of the negative electrode active material layer may be in a range of 0.1 mg/cm$^2$ to 2.0 mg/cm$^2$, particularly 0.3 mg/cm$^2$ to 1.8 mg/cm$^2$, and more particularly 0.5 mg/cm$^2$ to 1.6 mg/cm$^2$. When the above range is satisfied, an effect of improving the initial efficiency and lifetime of the battery may be maximized without reducing the energy density due to an increase in thickness of the negative electrode.

A thickness of the negative electrode active material layer may be in a range of 1 μm to 100 μm, particularly 1 μm to 50 μm, and more particularly 1 μm to 20 μm. When the above range is satisfied, the effect of improving the initial efficiency and lifetime of the battery may be maximized without reducing the energy density due to the increase in the thickness of the negative electrode.

3) Negative Electrode Binder

The negative electrode active material layer may further include a negative electrode binder. The negative electrode binder may include at least one selected from the group consisting of polyvinylidene fluoride (PVdF), polyvinyl alcohol (PVA), carboxymethyl cellulose (CMC), starch, hydroxypropyl cellulose, polyvinylpyrrolidone, polytetrafluoroethylene (PTFE), polytetrafluoroethylene, polyethylene, polypropylene, an ethylene-propylene-diene monomer (EPDM), a styrene-butadiene rubber (SBR), and a fluoro rubber.

The negative electrode binder may be included in an amount of 1 wt % to 20 wt %, particularly 1 wt % to 15 wt %, and more particularly 1 wt % to 10 wt % in the negative electrode active material layer. In a case in which the above range is satisfied, mechanical properties of the negative electrode may be improved while resistance of the negative electrode is maintained at a low level, and the storage and diffusion of the lithium ions may be further promoted.

In some cases, the negative electrode active material layer may further include at least one of lithium ion, lithium, and an alloy of lithium and silver nanoparticle. Specifically, if the all-solid lithium secondary battery is operated, at least one of lithium ion, lithium, and an alloy of lithium and silver nanoparticle may be present in the negative electrode active material layer by the lithium ions transferred from the positive electrode active material layer.

(2) Positive Electrode Active Material Layer

The all-solid lithium secondary battery may include a positive electrode active material layer. Specifically, the all-solid lithium secondary battery may include a positive electrode, and the positive electrode may include a positive electrode active material layer or may be composed of the positive electrode active material layer.

The positive electrode may include a positive electrode collector. The positive electrode collector is not particularly limited as long as it has high conductivity without causing adverse chemical changes in the positive electrode or the battery, and the positive electrode collector, for example, may include at least one selected from the group consisting of stainless steel, copper, aluminum, nickel, titanium, and fired carbon, and may specifically include aluminum. The positive electrode includes a carbon-based conductive agent and a binder, and may further include a primer layer which is coated on a surface of the positive electrode collector. Accordingly, electrical conductivity and a binding force between the positive electrode active material layer and the current collector may be significantly improved.

The positive electrode active material layer may be disposed on at least one surface of the positive electrode collector. Specifically, the positive electrode active material layer may be disposed on one surface or both surfaces of the positive electrode collector.

The positive electrode active material layer may include a positive electrode active material.

The positive electrode active material may include a layered compound, such as lithium cobalt oxide ($LiCoO_2$) or lithium nickel oxide ($LiNiO_2$), or a compound substituted with one or more transition metals; lithium manganese oxides including $Li_{1+x}Mn_{2-x}O_4$ (where, x is 0 to 0.33), $LiMnO_3$, $LiMn_2O_3$, $LiMn_2O_4$, and $LiMnO_2$; lithium copper oxide ($Li_2CuO_2$); vanadium oxides such as $LiV_3O_8$, $LiV_3O_4$, $V_2O_5$, and $Cu_2V_2O_7$; nickel (Ni)-site type lithium nickel oxide expressed by a chemical formula of $LiNi_{1-x}M_xO_2$ (where, M=cobalt (Co), manganese (Mn), aluminum (Al), copper (Cu), iron (Fe), phosphorus (P), magnesium (Mg), calcium (Ca), zirconium (Zr), titanium (Ti), ruthenium (Ru), niobium (Nb), tungsten (W), boron (B), silicon (Si), sodium (Na), potassium (K), molybdenum (Mo), vanadium (V), or gallium (Ga), and x=0.01 to 0.3); lithium manganese composite oxide expressed by a chemical formula of $LiMn_{1-x}M_xO_2$ (where, M=Co, nickel (Ni), Fe, chromium (Cr), zinc (Zn), or tantalum (Ta), and x=0.01 to or $Li_2Mn_3MO_8$ (where, M=Fe, Co, Ni, Cu, or Zn); spinel structure lithium manganese composite oxides expressed by $LiNi_xMn_{2-x}O_4$; $LiMn_2O_4$ having a part of lithium (Li) being substituted with alkaline earth metal ions; a disulfide compound; $LiMn_xFe_{1-x}PO_4$ ($0 \leq x \leq 0.9$); or $Fe_2(MoO_4)_3$. However, the positive electrode active material is not limited thereto.

The positive electrode active material may include $Li_{1+x}M_yO_{2+z}$, wherein M may be at least one element selected from the group consisting of Ni, Co, Mn, Fe, P, Al, Mg, Ca, Zr, Zn, Ti, Ru, Nb, W, B, Si, Na, K, Mo, and V, and $0 \leq x \leq 5$, $0 < y \leq 2$, and $0 \leq z \leq 2$. Specifically, $Li_{1+x}M_yO_{2+z}$ may include at least one selected from the group consisting of $LiCoO_2$, $LiNiO_2$, $LiMnO_2$, $Li[Ni_{0.5}Co_{0.3}Mn_{0.2}]O_2$, $Li[Ni_{0.6}Co_{0.2}Mn_{0.2}]O_2$, $Li[Ni_{0.7}Co_{0.1}Mn_{0.2}]O_2$, $Li[Ni_{0.8}Co_{0.1}Mn_{0.1}]O_2$, $Li[Ni_{0.9}Co_{0.05}Mn_{0.05}]O_2$, $LiMn_2O_4$, $LiFePO_4$, and $0.5Li_2MnO_3 \cdot 0.5Li[Mn_{0.4}Ni_{0.3}Co_{0.3}]O_2$. Preferably, $Li_{1+x}M_yO_{2+z}$ may include any one of $Li[Ni_{0.6}Co_{0.2}Mn_{0.2}]O_2$, $Li[Ni_{0.7}Co_{0.1}Mn_{0.2}]O_2$, $Li[Ni_{0.8}Co_{0.1}Mn_{0.1}]O_2$, and $Li[Ni_{0.9}Co_{0.05}Mn_{0.05}]O_2$. Since the positive electrode active material includes $Li_{1+x}M_yO_{2+z}$, lithium may be sufficiently supplied to the negative electrode, and, since $Li_{1+x}M_yO_{2+z}$ exhibits electrochemical activity after the first cycle without causing degradation of overall battery performance, a battery capacity loss due to irreversible capacity of the negative electrode may be prevented. The $Li_{1+x}M_yO_{2+z}$ may be in the form of a secondary particle which is formed by bonding or assembling primary particles, or, alternatively, may be in the form of a single particle.

The positive electrode active material may be included in an amount of 50 wt % to 95 wt %, specifically, 60 wt % to 90 wt % in the positive electrode active material layer.

The positive electrode active material layer may further include a solid electrolyte.

The solid electrolyte may specifically include at least one selected from the group consisting of a polymer solid electrolyte, an oxide-based solid electrolyte, a sulfide-based solid electrolyte, and a halide-based solid electrolyte.

The polymer solid electrolyte may be a composite of a lithium salt and a polymer resin. Specifically, the polymer solid electrolyte may be formed by adding a polymer resin to a solvated lithium salt. Specifically, ionic conductivity of the polymer solid electrolyte may be in a range of about $1 \times 10^{-7}$ S/cm or more, preferably, about $1 \times 10^{-3}$ S/cm or more.

The polymer resin includes a polyether-based polymer, a polycarbonate-based polymer, an acrylate-based polymer, a polysiloxane-based polymer, a phosphazene-based polymer, a polyethylene derivative, an alkylene oxide derivative such as polyethylene oxide, a phosphoric acid ester polymer, a poly agitation lysine, a polyester sulfide, polyvinyl alcohol, polyvinylidene fluoride, or a polymer containing an ionic dissociation group, and may include one or more thereof. Also, the polymer solid electrolyte is a polymer resin, wherein examples thereof may be a branched copolymer obtained by copolymerizing an amorphous polymer, such as PMMA, polycarbonate, polysiloxane (PDMS), and/or phosphazene, as a comonomer in a PEO (polyethylene oxide) main chain, a comb-like polymer resin, and a cross-linked polymer resin, and at least one thereof may be included.

The lithium salt is ionizable, wherein it may be expressed as $Li^+X^-$. An anion of the lithium salt is not particularly limited, but examples thereof may be $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The oxide-based solid electrolyte may include oxygen (O) and may have ion conductivity of a metal belonging to Group 1 or Group 2 of the periodic table. As a non-limiting example thereof, at least one selected from a LLTO-based compound, $Li_6La_2CaTa_2O_{12}$, $Li_6La_2ANb_2O_{12}$ (A is Ca or strontium (Sr)), $Li_2Nd_3TeSbO_{12}$, $Li_3BO_{2.5}N_{0.5}$, $Li_9SiAlO_8$, a LAGP-based compound, a LATP-based compound, $Li_{1+x}Ti_{2-x}Al_xSi_y(PO_4)_{3-y}$(where, $0 \leq x \leq 1$, $0 \leq y \leq 1$), $LiAl_xZr_{2-x}(PO_4)_3$ (where, $0 \leq x \leq 1$, $0 \leq y \leq 1$), $LiTi_xZr_{2-x}(PO_4)_3$ (where, $0 \leq x \leq 1$, $0 \leq y \leq 1$), a LISICON-based compound, a LIPON-based compound, a perovskite-based compound, a NASICON-based compound, and a LLZO-based compound may be included. However, the oxide-based solid electrolyte is not particularly limited thereto.

The sulfide-based solid electrolyte contains sulfur (S) and has ion conductivity of a metal belonging to Group 1 or Group 2 of the periodic table, wherein the sulfide-based solid electrolyte may include Li—P—S-based glass or Li—P—S-based glass ceramic. Non-limiting examples of the sulfide-based solid electrolyte may be $Li_6PS_5Cl$, $Li_6PS_5Br$, $Li_6PS_5I$, $Li_2S—P_2S_5$, $Li_2S—LiI—P_2S_5$, $Li_2S—LiI—Li_2O—P_2S_5$, $Li_2S—LiBr—P_2S_5$, $Li_2S—Li_2O—P_2S_5$, $Li_2S—Li_3PO_4—P_2S_5$, $Li_2S—P_2S_5—P_2O_5$, $Li_2S—P_2S_5—SiS_2$, $Li_2S—P_2S_5—SnS$, $Li_2S—P_2S_5—Al_2S_3$, $Li_2S—GeS_2$, and $Li_2S—GeS_2—ZnS$, and the sulfide-based solid electrolyte may include at least one thereof. However, the sulfide-based solid electrolyte is not particularly limited thereto.

The halide-based solid electrolyte may include at least one of $Li_3YCl_6$ and $Li_3YBr_6$, but is not particularly limited thereto.

The solid electrolyte may be included in an amount of 5 wt % to 50 wt %, specifically, 10 wt % to 30 wt % in the positive electrode active material layer.

The positive electrode active material layer may further include a positive electrode conductive agent.

The positive electrode conductive agent is not particularly limited as long as it has conductivity without causing adverse chemical changes in the positive electrode or the battery, and, for example, the positive electrode conductive agent may include one selected from conductive materials such as: graphite such as natural graphite or artificial graphite; carbon black such as carbon black, acetylene black, Ketjen black, channel black, furnace black, lamp black, and thermal black; graphene; conductive fibers such as carbon nanofibers and carbon nanotubes; fluorocarbon; metal powder such as aluminum powder and nickel powder; conductive whiskers such as zinc oxide whiskers and potassium titanate whiskers; conductive metal oxide such as titanium oxide; and polyphenylene derivatives, or a mixture of two or more thereof.

The positive electrode conductive agent may be included in an amount of 1 wt % to 30 wt % in the positive electrode active material layer.

The positive electrode active material layer may further include a positive electrode binder.

The positive electrode binder is not particularly limited as long as it a component that assists in the binding between the positive electrode active material and the conductive agent and in the binding with the current collector, and may specifically include at least one selected from the group consisting of polyvinylidene fluoride (PVdF), polyvinyl alcohol (PVA), carboxymethyl cellulose (CMC), starch, hydroxypropyl cellulose, polyvinylpyrrolidone, polytetrafluoroethylene (PTFE), polytetrafluoroethylene, polyethylene, polypropylene, an ethylene-propylene-diene monomer (EPDM), a styrene-butadiene rubber (SBR), and a fluoro rubber.

The positive electrode binder may be included in an amount of 1 wt % to 30 wt % in the positive electrode active material layer.

The positive active material layer may include at least one additive such as an oxidation stabilizing additive, a reduction stabilizing additive, a flame retardant, a thermal stabilizer, and an antifogging agent, if necessary.

(3) Solid Electrolyte Layer

The all-solid lithium secondary battery may include a solid electrolyte layer.

The solid electrolyte layer may play an insulating role and may function as an ion conductive channel in the all-solid lithium secondary battery.

Referring to FIG. 4, the solid electrolyte layer 300 may be disposed between the negative electrode active material layer 100 and the positive electrode active material layer 200.

The solid electrolyte layer 300 includes the solid electrolyte. The solid electrolyte may specifically include at least one selected from the group consisting of a polymer solid electrolyte, an oxide-based solid electrolyte, and a sulfide-based solid electrolyte.

The polymer solid electrolyte may be a composite of a lithium salt and a polymer resin. Specifically, the polymer solid electrolyte may be formed by adding a polymer resin to a solvated lithium salt. Specifically, ionic conductivity of the polymer solid electrolyte may be in a range of about $1\times10^{-7}$ S/cm or more, preferably, about $1\times10^{-3}$ S/cm or more.

The polymer resin includes a polyether-based polymer, a polycarbonate-based polymer, an acrylate-based polymer, a polysiloxane-based polymer, a phosphazene-based polymer, a polyethylene derivative, an alkylene oxide derivative such as polyethylene oxide, a phosphoric acid ester polymer, a poly agitation lysine, a polyester sulfide, polyvinyl alcohol, polyvinylidene fluoride, or a polymer containing an ionic dissociation group, and may include one or more thereof. Also, the polymer solid electrolyte is a polymer resin, wherein examples thereof may be a branched copolymer obtained by copolymerizing an amorphous polymer, such as PMMA, polycarbonate, polysiloxane (PDMS), and/or phosphazene, as a comonomer in a PEO (polyethylene oxide) main chain, a comb-like polymer resin, and a cross-linked polymer resin, and at least one thereof may be included.

The lithium salt is ionizable, wherein it may be expressed as $Li^+X^-$. An anion of the lithium salt is not particularly limited, but examples thereof may be $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The oxide-based solid electrolyte may include oxygen (O) and may have ion conductivity of a metal belonging to Group 1 or Group 2 of the periodic table. As a non-limiting example thereof, at least one selected from a LLTO-based compound, $Li_6La_2CaTa_2O_{12}$, $Li_6La_2ANb_2O_{12}$ (A is Ca or Sr), $Li_2Nd_3TeSbO_{12}$, $Li_3La_2CaTa_2O_{12}$, $Li_9SiAlO_8$, a LAGP-based compound, a LATP-based compound, $Li_{1+x}Ti_{2-x}Al_xSi_y(PO_4)_{3-y}$ (where, $0\leq x\leq 1$, $0\leq y\leq 1$) $LiAl_xZr_{2-x}(PO_4)_3$ (where, $0\leq x\leq 1$, $0\leq y\leq 1$), $LiTi_xZr_{2-x}(PO_4)_3$ (where, $0\leq x\leq 1$, $0\leq y\leq 1$), a LISICON-based compound, a LIPON-based compound, a perovskite-based compound, a NASICON-based compound, and a LLZO-based compound may be included. However, the oxide-based solid electrolyte is not particularly limited thereto.

The sulfide-based solid electrolyte contains sulfur (S) and has ion conductivity of a metal belonging to Group 1 or Group 2 of the periodic table, wherein the sulfide-based solid electrolyte may include Li—P—S-based glass or Li—P—S-based glass ceramic. Non-limiting examples of the sulfide-based solid electrolyte may be $Li_6PS_5Cl$, $Li_6PS_5Br$, $Li_6PS_5I$, $Li_2S—P_2S_5$, $Li_2S—LiI—P_2S_5$, $Li_2S—LiI—Li_2O—P_2S_5$, $Li_2S—LiBr—P_2S_5$, $Li_2S—Li_2O—P_2S_5$, $Li_2S—Li_3PO_4—P_2S_5$, $Li_2S—P_2S_5—P_2O_5$, $Li_2S—P_2S_5—SiS_2$, $Li_2S—P_2S_5—SnS$, $Li_2S—P_2S_5—Al_2S_3$, $Li_2S—GeS_2$, and $Li_2S—GeS_2—ZnS$, and the sulfide-based solid electrolyte may include at least one thereof. However, the sulfide-based solid electrolyte is not particularly limited thereto.

The solid electrolyte layer may further include a binder for a solid electrolyte layer. The binder for a solid electrolyte layer may be introduced for binding between the solid electrolytes and binding between the solid electrolyte layer and battery elements (e.g., positive electrode, negative electrode, etc.) stacked on both surfaces thereof.

A material of the binder for a solid electrolyte layer is not particularly limited and may be appropriately selected within a range of components used as a binder of the solid electrolyte in the all-solid lithium secondary battery. Specifically, the binder for a solid electrolyte layer may include at least one selected from the group consisting of polyvinylidene fluoride (PVdF), polyvinyl alcohol (PVA), carboxymethyl cellulose (CMC), starch, hydroxypropyl cellulose, polyvinylpyrrolidone, polytetrafluoroethylene, polyethylene, polypropylene, an ethylene-propylene-diene monomer (EPDM), a styrene-butadiene rubber (SBR), a styrene-butadiene styrene block copolymer (SBS), a nitrile butadiene rubber (NBR), a fluoro rubber, and an acrylic binder.

A thickness of the solid electrolyte layer may be in a range of 10 μm to 90 μm, specifically, 20 μm to 80 μm, in consideration of ionic conductivity, physical strength, and energy density of a battery using the solid electrolyte layer. Also, tensile strength of the solid electrolyte layer may be in a range of 500 $kgf/cm^2$ to 2,000 $kgf/cm^2$. Furthermore, porosity of the solid electrolyte layer 300 may be 15% or less or about 10% or less.

Figure 5:
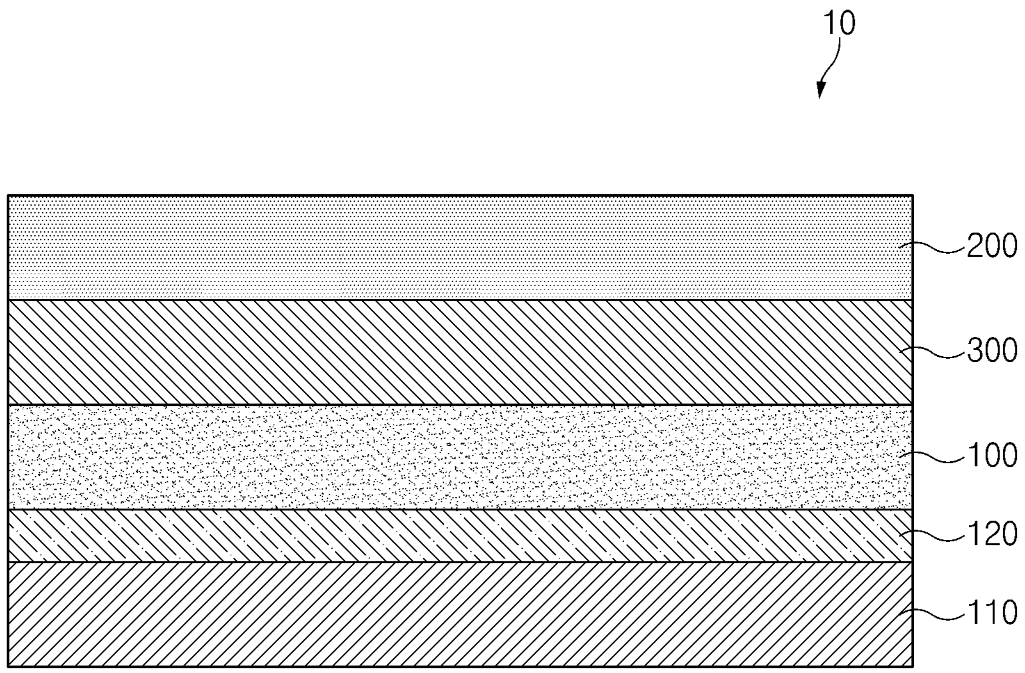
FIG. 5 is a schematic diagram of an all-solid lithium secondary battery according to another embodiment of the present disclosure.

The all-solid lithium secondary battery may further include a metal layer. Referring to FIG. 5, the all-solid lithium secondary battery 10 further includes a negative electrode collector 110, and may further include a metal layer 120 disposed between the negative electrode active material layer 100 and the negative electrode collector 110 in a charged state. The metal layer 120 may include lithium, and may specifically be formed of lithium.

The metal layer may mean a layer which is formed by storing the lithium ions transferred from the positive electrode active material layer on the negative electrode collector and the negative electrode active material layer through the negative electrode active material layer when the all-solid lithium secondary battery is charged. Thus, the metal layer appears clearly during charge.

The metal layer is observed during a discharge process, but, theoretically, may not be observed during complete discharge.

The present disclosure is meaningful in an all-solid lithium secondary battery, and may not have much meaning in a lithium secondary battery using a liquid electrolyte. For example, if the liquid electrolyte is used, since lithium (e.g., in the form of a metal layer) stored in the negative electrode may be continuously exposed to the liquid electrolyte, it may be difficult to completely store the lithium in the negative electrode.

Method of Preparing all-Solid Lithium Secondary Battery

A method of preparing an all-solid lithium secondary battery according to another embodiment of the present disclosure may include: a first step of forming dry mixed powder including graphitized platelet carbon nanofibers and silver nanoparticles disposed on the graphitized platelet carbon nanofibers by reducing silver ions in a mixture of the silver ions and the graphitized platelet carbon nanofibers; and a second step of forming a negative electrode active material layer on a negative electrode collector through a negative electrode slurry including the dry mixed powder. Herein, the all-solid lithium secondary battery may be the same as the all-solid lithium secondary battery of the above-described embodiment. Also, the negative electrode active material layer may be the same as the negative electrode active material layer of the above-described embodiment.

(1) First Step

In the first step, dry mixed powder including the graphitized platelet carbon nanofibers and silver nanoparticles disposed on the graphitized platelet carbon nanofibers is formed. The dry mixed powder may be prepared by mixing silver nanoparticles in the form of powder and graphitized platelet carbon nanofibers in the form of powder. Alternatively, the dry mixed powder may also be prepared by mixing graphitized platelet carbon nanofibers in a silver ion solution and then reducing silver nano ions. As a method of reducing the silver nanoparticles, there are various methods such as a chemical reduction method, an electrochemical reduction method, a photochemical reduction method, a laser reduction method, an ultrasonic reduction method, and sputtering, but, preferably, a chemical reduction method using a polyol process or a microwave-assisted polyol method using microwave may be used.

In the polyol process, the silver ion solution may include a solvent and a stabilizer in addition to the silver ions. Ethylene glycol may be used as the solvent, and polyvinylpyrrolidone may be used as the stabilizer. However, the present disclosure is not necessarily limited thereto.

A molar concentration of the silver ions in the silver ion solution may be in a range of 1 mM to 1,000 mM, particularly 1 mM to 500 mM, and more particularly 1 mM to 300 mM. When the above molar concentration range is satisfied, since amount and size of the silver nanoparticles formed may be adjusted to an appropriate level, capacity, initial charge/discharge efficiency, and life characteristics of the all-solid lithium secondary battery may be effectively controlled.

In the first step, the reducing of the silver ions may include reacting the mixed solution at 100° C. to 500° C., and may specifically include reacting at 100° C. to 300° C. That is, the mixed solution may be reacted by performing a heat treatment at the above-described temperature. Accordingly, the silver ions may be appropriately reduced to obtain silver nanoparticles having a desirable size. Also, the silver nanoparticles may be disposed on surfaces of the graphitized platelet carbon nanofibers in the above process.

The reducing of the silver ions may include adjusting a pH of the mixed solution. Specifically, the mixed solution may be adjusted to have an acidity of pH 8 to pH 14, more specifically, pH 9 to pH 13. Accordingly, the silver ions may be appropriately reduced to obtain silver nanoparticles having a desirable size.

Thereafter, the dry mixed powder may be obtained by washing and then drying a solid content of the mixed solution.

In the dry mixed powder, a weight ratio of the graphitized platelet carbon nanofibers to the silver nanoparticles may be in a range of 99:1 to 60:40, particularly 97:3 to 70:30, and more particularly 95:5 to 80:20. When the above range is satisfied, the capacity and initial charge/discharge efficiency of the all-solid lithium secondary battery may be more effectively improved.

(2) Second Step

In the second step, a negative electrode active material layer may be formed on a negative electrode collector through a negative electrode slurry including the dry mixed powder. The negative electrode slurry may include the dry mixed powder and a solvent for a negative electrode slurry.

The solvent for a negative electrode slurry may be selected from the group consisting of water and N-methyl pyrrolidone, but is not necessarily limited thereto.

The negative electrode slurry may further include a negative electrode binder. The negative electrode binder may be the same as the negative electrode binder of the above-described embodiment.

In the second step, the negative electrode active material layer may be formed by coating and drying the negative electrode slurry on the negative electrode collector. In some cases, in addition to the coating and drying processes, a pressurizing process may be added.

Also, the present disclosure provides a battery module including the all-solid lithium secondary battery as a unit cell, a battery pack including the battery module, and a device including the battery pack as a power source. In this case, specific examples of the device may be a power tool that is operated by being powered by an electric motor; electric cars including an electric vehicle (EV), a hybrid electric vehicle (HEV), and a plug-in hybrid electric vehicle (PHEV); electric two-wheeled vehicles including an electric bicycle (E-bike) and an electric scooter (E-scooter); an electric golf cart; urban air mobility (UAM); and a power storage system, but the device is not limited thereto.

Hereinafter, the present disclosure will be described in more detail, according to examples, but the following examples are merely presented to exemplify the present disclosure, and the scope of the present disclosure is not limited thereto.

EXAMPLES AND COMPARATIVE EXAMPLES

Example 1: Preparation of all-Solid Lithium Secondary Battery (1) Negative Electrode Preparation Platelet carbon nanofibers were heat-treated at a temperature of 2,800° C. for 6 hours in an argon (Ar) atmosphere to prepare graphitized platelet carbon nanofibers.

Figure 8:
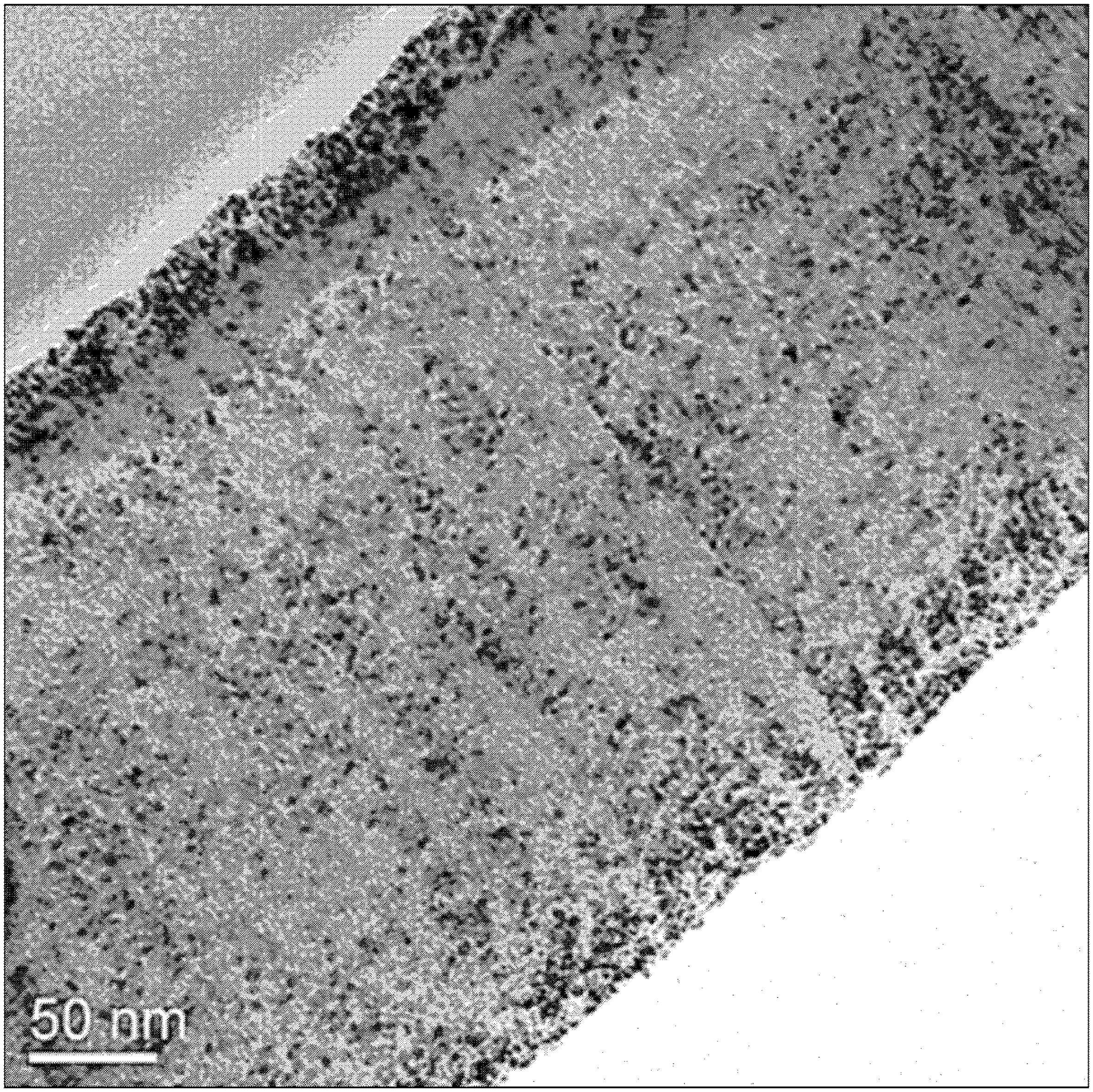
FIG. 8 is a TEM image of a graphitized platelet carbon nanofiber including silver nanoparticles which is used in the all-solid lithium secondary battery according to an embodiment of the present disclosure.

A mixed solution was prepared by mixing the graphitized platelet carbon nanofibers, $AgNO_3$, and polyvinylpyrrolidone in an ethylene glycol solvent, adjusting pH to satisfy a range of 8 to 14 through NaOH pellets, and then stirring for 24 hours. Heating and cooling were repeated by treating the mixed solution, which had been subjected to Ar bubbling with an ultrasonic device, in time units of 10 seconds, 20 seconds, 30 seconds, 1 minute, 2 minutes, and 5 minutes using a continuous wave mode (2.45 GHz, 500 W) of a microwave reactor (LG Electronics). Silver ions were reduced through this so that silver nanoparticles were disposed on the graphitized platelet carbon nanofibers. Thereafter, filtering and washing were performed using an acetone solution and drying was performed in a vacuum oven at 100° C. for 24 hours to obtain dry mixed powder including graphitized platelet carbon nanofibers and silver nanoparticles disposed on the graphitized platelet carbon nanofibers (see FIG. 8). An amount of the silver nanoparticles was 10 wt % (based on a total weight of the graphitized platelet carbon nanofibers and the silver nanoparticles), and an average particle diameter of the silver nanoparticles was 2 nm.

The dry mixed powder and polyvinylidene fluoride were added to N-methyl pyrrolidone (NMP), as a solvent, and stirred to form a negative electrode slurry. In the negative electrode slurry, a weight ratio of the dry mixed powder to the polyvinylidene fluoride was 93:7.

The negative electrode slurry was applied to a stainless steel current collector (thickness: 15 μm), dried in a vacuum oven at 100° C. for 12 hours, and then subjected to a rolling process using a roll press to prepare a negative electrode including the stainless steel current collector and a negative electrode active material layer disposed on the stainless steel current collector. A thickness of the negative electrode active material layer was 10 μm, and a loading amount of the negative electrode active material layer was 1 $mg/cm^2$.

(2) Positive Electrode Preparation $Li[Ni_{0.82}Co_{0.14}Mn_{0.04}]O_2$ as a positive electrode active material, $Li_6PS_6Cl$ as a solid electrolyte, carbon nanofibers (VGCF, Showa Denko) as a conductive agent, and polytetrafluoroethylene, as a binder, were sequentially added to a container at a weight ratio of 77:20:1:2. A positive electrode mixture was prepared by mixing 10 times for 30 seconds at 10,000 RPM using a lab blender whenever each component was added. High shear mixing was performed on the mixture for 5 minutes by applying a shear force at 100 rpm at 100° C. using a twin screw kneader (LG Electronics) to prepare a positive electrode mixture. A free-standing film having a thickness of 200 μm was prepared from the positive electrode mixture by using two roll mil equipment (Inoue Mfg., Inc.) at 100° C. Thereafter, the film was disposed on one side of a primer-coated aluminum current collector (thickness: 20 μm), and the film was bonded to the current collector using a lamination roll maintained at 120° C. to prepare a positive electrode.

(3) Preparation of all-Solid Lithium Secondary Battery

After $Li_6PS_6Cl$ solid electrolyte and nitrile butadiene rubber (NBR) were mixed with xylene as a solvent, the mixture was mixed together with zirconia balls at 2,000 RPM for 1 minute times using a Thinky Mixer to prepare a solid electrolyte slurry. The solid electrolyte slurry was coated on a PET film as a release paper, and dried in a vacuum oven at 45° C. for 6 hours to prepare a solid electrolyte layer. In this case, a weight ratio of the $Li_6PS_6Cl$ solid electrolyte to the nitrile butadiene rubber (NBR) was 95:5 in wt %, and a thickness of the prepared solid electrolyte layer was 100 μm.

After an assembly was prepared by disposing the solid electrolyte layer between the negative electrode and the positive electrode, the assembly was put in a pouch and sealed. Thereafter, after the pouch was fixed on an Al plate, the pouch was pressurized at 500 MPa for 30 minutes using an isostatic press (Warm Isostatic Pressure) to prepare an all-solid lithium secondary battery of Example 1.

Examples 2 to 5: Preparation of all-Solid Lithium Secondary Batteries

All-solid lithium secondary batteries were prepared in the same manner as in Example 1 except that a weight ratio of graphitized platelet carbon nanofibers, $AgNO_3$, and polyvinylidenepyrrolidone, a pH value, and reaction conditions in the microwave reactor were controlled to adjust amount and average particle diameter of silver nanoparticles as shown in Table 1.

Comparative Examples 1 and 2: Preparation of all-Solid Lithium Secondary Batteries (1) Negative Electrode Preparation All-solid lithium secondary batteries were prepared in the same manner as in Example 1 except that carbon black (PRINTEX, Orion Engineered Carbons) was used instead of the graphitized platelet carbon nanofibers in Example 1, and a weight ratio of the carbon black, $AgNO_3$, and polyvinylidenepyrrolidone, a pH value, and reaction conditions in the microwave reactor were controlled to adjust amount and average particle diameter of silver nanoparticles as shown in Table 2.

Comparative Example 3: Preparation of Lithium Secondary Battery (1) Negative Electrode and Positive Electrode Preparation Negative electrode and positive electrode were prepared in the same manner as in Example 1.

(2) Preparation of Lithium Secondary Battery

Thereafter, after a monocell was prepared by disposing a 15 μm thick polyethylene-based separator between the prepared negative electrode and positive electrode, an electrolyte solution (ethylene carbonate (EC)/ethylmethyl carbonate (EMC)=½ (volume ratio), lithium hexafluorophosphate ($LiPF_6$ 1 mol)) was injected into the monocell to prepare a lithium secondary battery.

Comparative Example 4: Preparation of Lithium Secondary Battery

A lithium secondary battery was prepared in the same manner as in Comparative Example 3 except that a weight ratio of graphitized platelet carbon nanofibers, $AgNO_3$, and polyvinylpyrrolidone, a pH value, and reaction conditions in the microwave reactor were controlled to adjust amount and average particle diameter of silver nanoparticles as shown in Table 2.

Comparative Example 5: Preparation of Lithium Secondary Battery

Figure 9:
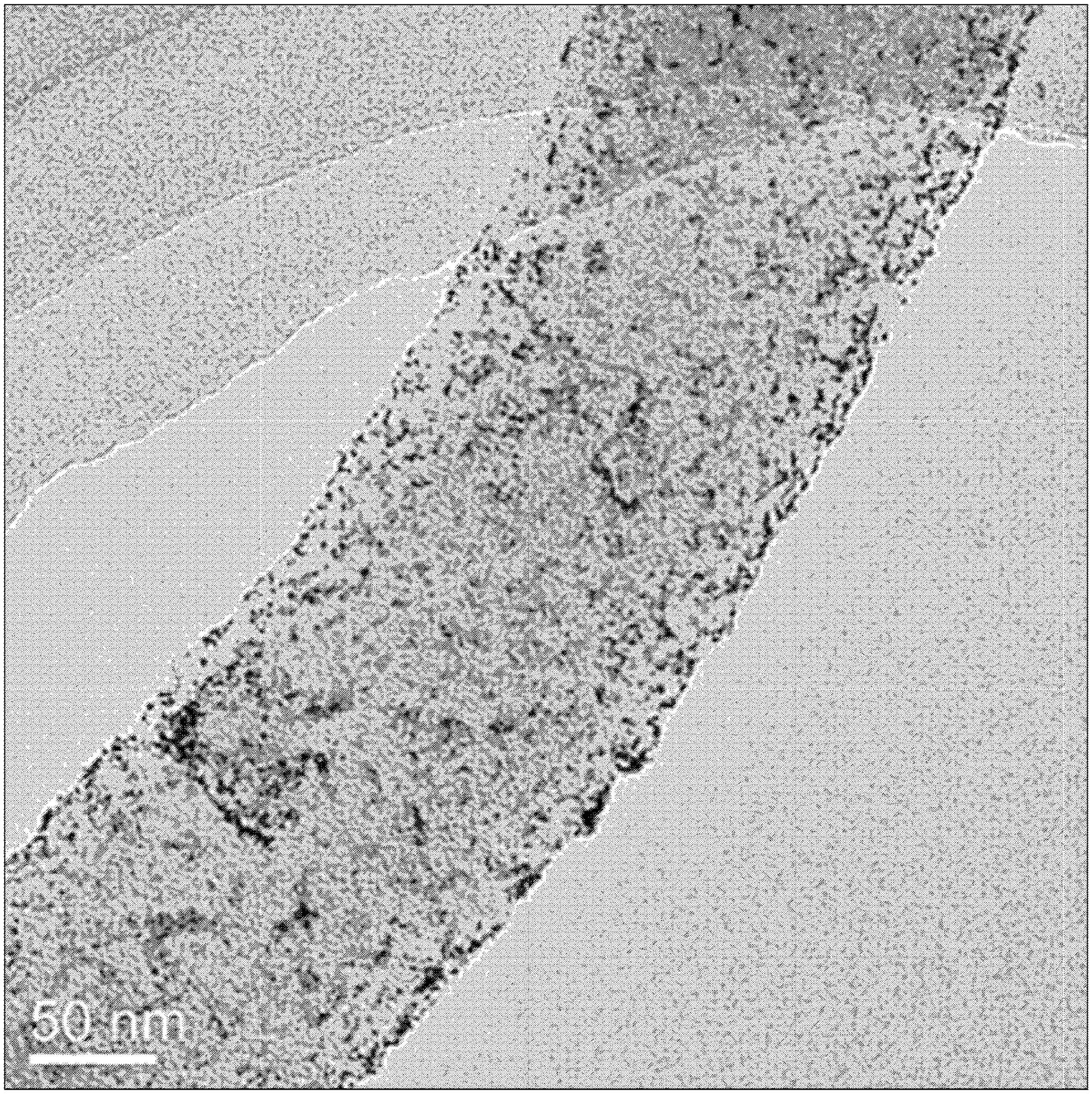
FIG. 9 is a TEM image of a platelet carbon nanofiber including silver nanoparticles which is used in an all-solid lithium secondary battery according to another embodiment of the present disclosure.

An all-solid lithium secondary battery was prepared in the same manner as in Example 1 except that non-graphitized platelet carbon nanofibers were used instead of the graphitized platelet carbon nanofibers. FIG. 9 is a TEM image of dry mixed powder including silver nanoparticles disposed on the platelet carbon nanofiber.

As a result of observing the prepared negative electrodes, d(002) of the graphitized platelet carbon nanofibers of Examples 1 to 5 and Comparative Examples 3 and 4 was 0.335 nm, and Lc(002) was 41 nm. A Bruker AXS D4 Endeavor XRD (voltage: 40 kV, current: 40 mA) was used for XRD analysis of the graphitized platelet carbon nanofibers. The XRD analysis was performed by measuring at a scanning rate of 87.5 seconds for every 0.02° from a 2-Theta of 10° to 90° under Cu Kα radiation (wavelength: 1.54 Å). Among the measurement results, a Full Width at Half-Maximum (FWHM) of a (002) crystal peak, which appeared at a 2θ of about 20° to 30°, may be measured, and was calculated through the Scherrer equation to obtain the d(002) value and Lc(002) value. $I_D/I_G$ (ratio) of the graphitized platelet carbon nanofiber was 0.24. The $I_D/I_G$ (ratio) was measured from a wavelength-peak graph during Raman spectrum measurement.

The platelet carbon nanofibers were also evaluated in the same manner.

TABLE 1

| | d(002) (nm) | Lc(002) (nm) | $I_D/I_G$ |
|---|---|---|---|
| Graphitized platelet carbon nanofiber | 0.335 | 41 | 0.24 |

TABLE 1-continued

| | d(002) (nm) | Lc(002) (nm) | $I_D/I_G$ |
|---|---|---|---|
| Platelet carbon nanofiber | 0.336 | 28 | 1.33 |

An average length of the platelet carbon nanofibers and the graphitized platelet carbon nanofibers was 1 μm, and an average diameter was 200 nm. The average diameter corresponds to an average value of diameters of top 50 graphitized platelet carbon nanofibers and diameters of bottom 50 graphitized platelet carbon nanofibers (or platelet carbon nanofibers) in order of largest average diameter when the negative electrode active material layer is observed at ×20,000 magnification with a scanning electron microscope (SEM). The average length corresponds to an average value of lengths of top 50 graphitized platelet carbon nanofibers (or platelet carbon nanofibers) and lengths of bottom 50 graphitized platelet carbon nanofibers (or platelet carbon nanofibers) in order of greatest average length when the negative electrode active material layer is observed at ×20,000 magnification with an SEM.

Experimental Example 1: Initial Charge/Discharge Efficiency Evaluation

Each of the batteries of the examples and the comparative examples was mounted on a pressure jig, and bolts/nuts located at square corners were tightened with the same pressure of 1 N·m to prepare a monocell. When the monocell was charged once and discharged once at 60° C. under the following conditions, initial charge/discharge efficiency was evaluated as a ratio of one-time charge capacity to one-time discharge capacity (see Table 2).

Charging conditions: CC charged at 0.1 C to 4.25 V, thereafter CV charged at 4.25 V 0.05 C cut-off Discharging conditions: CC discharged at 0.1 C to 3.0 V

Experimental Example 2: Capacity Retention Evaluation

After charging and discharging each of the batteries of the examples and the comparative examples at 60° C. under the following conditions, a capacity retention (%) in a 50th cycle was evaluated. Discharge capacity in the first charge/discharge cycle was set as 100%.

Charging conditions: CC charged at 0.5 C to 4.25 V, 0.5 C cut-off

Discharging conditions: CC discharged at 0.33 C to 3.0 V

TABLE 2

| | Carbon material type | Silver nanoparticles amount (wt %) | Average particle diameter of silver nanoparticles (nm) | Whether or not a solid electrolyte layer was used | Initial charge and discharge efficiency (%) | 0.5 C/0.5 C 60° C. capacity retention (%, @50 cycle) |
|---|---|---|---|---|---|---|
| Example 1 | GPCNF | 10 | 2 | ○ | 98.1 | 97.2 |
| Example 2 | GPCNF | 5 | 1.5 | ○ | 95.7 | 94.9 |
| Example 3 | GPCNF | 20 | 3.5 | ○ | 96.8 | 95.3 |
| Example 4 | GPCNF | 30 | 6 | ○ | 95.5 | 94.2 |
| Example 5 | GPCNF | 10 | 10 | ○ | 97.6 | 96.9 |
| Comparative Example 1 | CB | 10 | 5 | ○ | 71.3 | 85.8 |
| Comparative Example 2 | CB | 10 | 10 | ○ | 63.7 | 82.5 |
| Comparative Example 3 | GPCNF | 10 | 2 | X | 95.7 | 74.8 |

TABLE 2-continued

| | Carbon material type | Silver nanoparticles amount (wt %) | Average particle diameter of silver nanoparticles (nm) | Whether or not a solid electrolyte layer was used | Initial charge and discharge efficiency (%) | 0.5 C/0.5 C 60° C. capacity retention (%, @50 cycle) |
|---|---|---|---|---|---|---|
| Comparative Example 4 | GPCNF | 10 | 10 | X | 95.1 | 73.9 |
| Comparative Example 5 | PCNF | 10 | 1.5 | ○ | 96.6 | 95.1 |

The average particle diameter of the silver nanoparticles corresponds to an average value of particle diameters of top 50 silver nanoparticles having a large particle diameter and particle diameters of bottom 50 silver nanoparticles when the graphitized platelet carbon nanofiber including the silver nanoparticles of the negative electrode active material layer is observed at ×1,000,000 magnification with a TEM. GPCNF is graphitized platelet carbon nanofibers, PCNF is non-graphitized platelet carbon nanofibers, and CB is carbon black.

The amount of the silver nanoparticles means an amount based on a total weight of the platelet carbon nanofibers and the silver nanoparticles in the negative electrode active material layer.

The invention claimed is:

1. An all-solid lithium secondary battery comprising:

a positive electrode active material layer;

a negative electrode active material layer; and a solid electrolyte layer between the positive electrode active material layer and the negative electrode active material layer, wherein the negative electrode active material layer comprises graphitized platelet carbon nanofibers and silver nanoparticles, wherein the graphitized platelet carbon nanofiber has a form in which a plurality of graphene sheets are stacked in a growth direction of the graphitized platelet carbon nanofiber, wherein the graphitized platelet carbon nanofiber comprises a curved portion protruding toward a side of the graphitized platelet carbon nanofiber, and wherein the curved portion corresponds to a basal plane of the graphene sheet.

2. The all-solid lithium secondary battery of claim 1, wherein the graphitized platelet carbon nanofibers are formed by heat-treating platelet carbon nanofibers at a temperature of 2,000° C. or higher.

3. The all-solid lithium secondary battery of claim 1, wherein the silver nanoparticle is disposed on a surface of the graphitized platelet carbon nanofiber.

4. The all-solid lithium secondary battery of claim 1, wherein, in X-ray diffraction (XRD) measurement of the graphitized platelet carbon nanofiber, d(002) of the graphitized platelet carbon nanofiber is in a range of 0.330 nm to 0.350 nm.

5. The all-solid lithium secondary battery of claim 1, wherein, in XRD measurement of the graphitized platelet carbon nanofiber, Lc(002) of the graphitized platelet carbon nanofiber is in a range of 20 nm to 200 nm.

6. The all-solid lithium secondary battery of claim 1, wherein the graphitized platelet carbon nanofiber has an $I_D/I_G$ of 0.1 to 1.0.

7. The all-solid lithium secondary battery of claim 1, wherein the graphitized platelet carbon nanofiber has an average diameter of 10 nm to 500 nm.

8. The all-solid lithium secondary battery of claim 1, wherein the graphitized platelet carbon nanofiber has an average length of 0.1 μm to 5 μm.

9. The all-solid lithium secondary battery of claim 1, wherein the graphitized platelet carbon nanofiber has a specific surface area of 5 $m^2/g$ to 100 $m^2/g$.

10. The all-solid lithium secondary battery of claim 1, wherein the graphitized platelet carbon nanofibers are included in an amount of 50 wt % to 98 wt % in the negative electrode active material layer.

11. The all-solid lithium secondary battery of claim 1, wherein the silver nanoparticle has an average particle diameter of 1 nm to 100 nm.

12. The all-solid lithium secondary battery of claim 1, wherein the silver nanoparticles are included in an amount of 1 wt % to 40 wt % based on a total weight of the graphitized platelet carbon nanofibers and the silver nanoparticles in the negative electrode active material layer.

13. The all-solid lithium secondary battery of claim 1, wherein a weight ratio of the graphitized platelet carbon nanofibers to the silver nanoparticles is in a range of 99:1 to 60:40.

14. The all-solid lithium secondary battery of claim 1, wherein the negative electrode active material layer further comprises a negative electrode binder.

15. The all-solid lithium secondary battery of claim 1, wherein the negative electrode active material layer has a thickness of 1 μm to 100 μm.

16. The all-solid lithium secondary battery of claim 1, further comprising a negative electrode collector, and a metal layer between the negative electrode active material layer and the negative electrode collector in a charged state, wherein the metal layer comprises lithium.

17. A method of preparing the all-solid lithium secondary battery of claim 1, the method comprising:

forming dry mixed powder including graphitized platelet carbon nanofibers and silver nanoparticles disposed on the graphitized platelet carbon nanofibers by reducing silver ions in a mixture of the silver ions and the graphitized platelet carbon nanofibers; and forming a negative electrode active material layer on a negative electrode collector through a negative electrode mixture including the dry mixed powder.

* * * * *